March 10, 1964

A. L. ELSTON 3,124,058

COOKING DEVICES

Filed July 15, 1960

Inventor
ARTHUR L. ELSTON
by Roy E. Petterbridge
Atty.

March 10, 1964

A. L. ELSTON 3,124,058

COOKING DEVICES

Filed July 15, 1960

Inventor
ARTHUR L. ELSTON.

by Roy E. Petterbridge
Atty.

March 10, 1964 A. L. ELSTON 3,124,058
COOKING DEVICES

Filed July 15, 1960 7 Sheets-Sheet 3

Fig. 4

Inventor
ARTHUR L. ELSTON

March 10, 1964 A. L. ELSTON 3,124,058
COOKING DEVICES
Filed July 15, 1960 7 Sheets-Sheet 4

Fig. 5

Inventor
ARTHUR L. ELSTON
by Roy E. Petherbridge
Atty.

March 10, 1964     A. L. ELSTON     3,124,058
COOKING DEVICES Filed July 15, 1960     7 Sheets-Sheet 5

Inventor
ARTHUR L. ELSTON

March 10, 1964     A. L. ELSTON     3,124,058
COOKING DEVICES Filed July 15, 1960     7 Sheets-Sheet 6

Inventor
ARTHUR L. ELSTON

March 10, 1964 A. L. ELSTON 3,124,058
COOKING DEVICES

Filed July 15, 1960 7 Sheets-Sheet 7

Fig. 9

Inventor
ARTHUR L. ELSTON
by
Atty.

United States Patent Office 3,124,058
Patented Mar. 10, 1964

3,124,058
COOKING DEVICES
Arthur L. Elston, Kewanee, Ill., assignor to Kof-E-Brake Donut Company, Inc., Kewanee, Ill.
Filed July 15, 1960, Ser. No. 43,240
6 Claims. (Cl. 99—354)

This invention relates generally to cooking devices and has to do particularly with an automatic device for cooking or frying doughnuts and like articles.

In general terms the invention as set forth deals with introducing a doughy article into a relatively deep trough of hot frying oil or similar liquid, and throughly cooking the article by advancing it in a predetermined manner for a predetermined time along or through the oil, and then ejecting or withdrawing the properly cooked article from the trough. Similar cooking devices are known in the art, but each has met with a modicum of success since they have been, in fact, complicated machines, expensive to construct, troublesome in operation, and difficult to repair and clean. With an awareness of such prior devices, this invention deals specifically with improvements thereof which results in a relatively inexpensive machine, simple in construction and operation which is conducive to extended use of the machine for quantity production of deep fried articles, such as doughnuts.

Again in general terms, it is the object of this invention to provide a cooking device which will permit the introduction of a doughy article into a deep trough of hot cooking oil in a particular manner so that the article is confined within a pocket or cell, thereupon to be transferred successively through a series of pockets for one-half the required cooking time, whereupon the article is flipped over so that the heretofore uncooked upper portion of the article is immersed in the cooking oil, and for a like period of cooking time the article is advanced successively through another series of pockets onward to an ejection station, whereat the article is withdrawn from the oil. To accomplish this progressive movement of the article through the cooking oil it is necessary to establish a series of companion pockets or cells, such that one series overlies the other series; thus the upper series of pockets (operatively at approximately the liquid level) moves longitudinally a predetermined distance advancing the articles confined thereby, whereupon the upper series of pockets rises vertically a distance sufficient to clear the floating articles and returns in a longitudinal movement to its initial position, where it then moves vertically downward into the liquid for confinement of the articles and a repeat of the cycle described. So that the articles will remain properly positioned the lower series of pockets moves vertically upward and downward in unison with the upper series of pockets, whereby to confine the articles during the longitudinal return movement of the upper series of pockets. This action is known in the art.

At selected times in the cooking cycle, the article being advanced through the hot oil will, as mentioned, at a particular station be "flipped over," and at another particular station the article will be withdrawn and ejected from the oil. Synchronization of parts to make the cooking device workable is obviously of prime importance. Too often, those skilled in the art have relied on multi-drives and complicated linkage systems to provide proper timing and sequence arrangements.

Thus the combination of elements which heretofore have been utilized to operate such a device have not been adequate for commercial purposes for the reasons previously set forth. To overcome the difficulties and objections which attend the presently known constructions is the main object of this invention. It is accomplished in a novel manner and involves features quite distinct from those now known in the art and practical in the field.

One feature of the invention relates to an improved drop pan and hook arrangement whereby the doughy article introduced into the hot oil is adequately supported in its initial heavy state, i.e. where it tends to sink to the bottom of the trough, in a manner whereby it is positively transferred to and confined in a pocket and started into its cooking cycle in spite of its condition of "non-floating," and in counter-action to any backwash set up in the oil by movement of the drop pan or pocket elements therethrough.

Another feature is the establishment of a unitary or single drive shaft for transferring and converting the rotary movement thereof to effectuate varied and multi-directional movement of the interrelated elements necessary to operate such an automatic cooking device, and providing simple and accurate synchronization of said elements. Many desirable features attend a simplification of the drive system, the most important commercially being an elimination of many parts previously found necessary, and through such reduction of parts providing a machine simpler to fabricate and easier to maintain.

Most helpful in simplifying such a machine through elimination of parts is the provision of a novel double acting cam arrangement which operates a single arm element in a reciprocating as well as swingable fashion to advance the doughy article from pocket-to-pocket through the predetermined cooking cycle.

Also an aid in the simplification of such a machine is the utilization of a unitary source of supply for the dough hopper which remains stationary during operation of the cooking device, but which is removable and replaceable in a convenient and simple manner. This source of dough supply, or hopper, though physically supported in a position overlying the cooking device is connected only electrically to the machine operation, and through the means of a micro-switch is synchronized to the cooking cycle and pocket movements. Such an arrangement not only affords simple construction at the initial or starting station of the machine, but it also eliminates the mechanical tie in to the drive system. Obviously, cleaning of the machine and quick change of dough supply is facilitated.

While there are other features involved in this invention, such features and the objects and advantages attending them will appear or be apparent to one skilled in the art from the following description, reference being made to the accompanying drawings in which.

Figure 1:
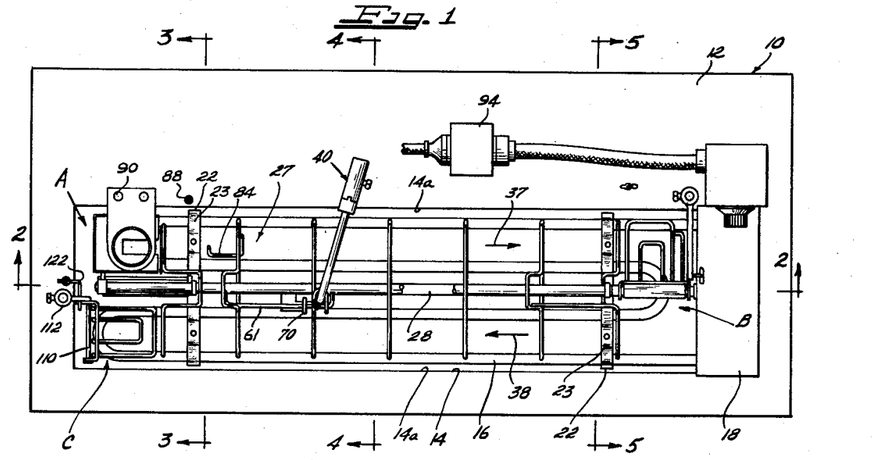
FIG. 1 is a plan view of a cooking device constructed in accordance with the teachings of this invention viewed substantially as indicated by line 1—1 of FIG. 2.
Figure 2:
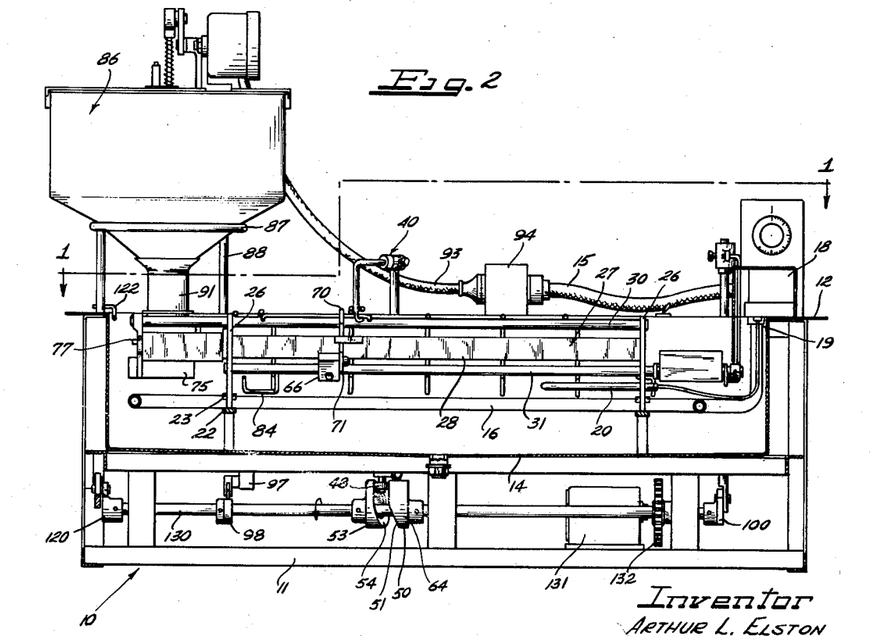
FIG. 2 is a vertical sectional view taken along line 2—2 of FIG. 1.

Referring now to the drawings, and particularly to FIGS. 1 and 2, reference numeral 10 designates in general a cooking device for frying or cooking of doughnuts and like articles, said cooking device comprising a frame arrangement 11 which underlies and supports a body portion 12, the body portion 12 having formed therein a relatively deep trough 14. The trough 14 is filled with a cooking oil or similar liquid of the proper type for whatever article is to be cooked therein, and as indicated by dot-dash line 15 the liquid level is established at about two-thirds the capacity of the trough. Actually the liquid level is maintained within reasonable limits to a particular depth which, as will be obvious in explanation of the device operation, is suitable for "floating" the article at a position to permit its being confined and acted upon by pocket forming members.

To heat the oil to a temperature adequate for cooking purposes there is provided within the trough 14, a heating element 16, said heating element being of the well known electrical type and having as its source of energy and control the control unit 18, to which it is connected, as at 19. It is appreciated that depending on the composition and consistency of the doughy article to be cooked, as well as on the nature of the oil to be utilized for cooking, a particular temperature of the oil should be maintained; to this purpose a temperature control through thermostatic means 20 is provided, which through the control unit 18 acts in a known manner to control the heating element 16.

The heating element 16, disposed in a configuration adapted to insure even distribution of heat throughout the oil, is spaced from the bottom wall of the trough a distance sufficient to place it more-or-less in the middle of the oil, and it is maintained in this position by means of support bars to which the heating element is attached by brackets 23. The support bars 22 suitably secured to the bottom wall of the trough by posts 24 provide upstanding support members 26 which, in a manner to be described, support the pocket forming assembly, indicated generally by numeral 27, centrally of and within the trough 14.

Figure 4:
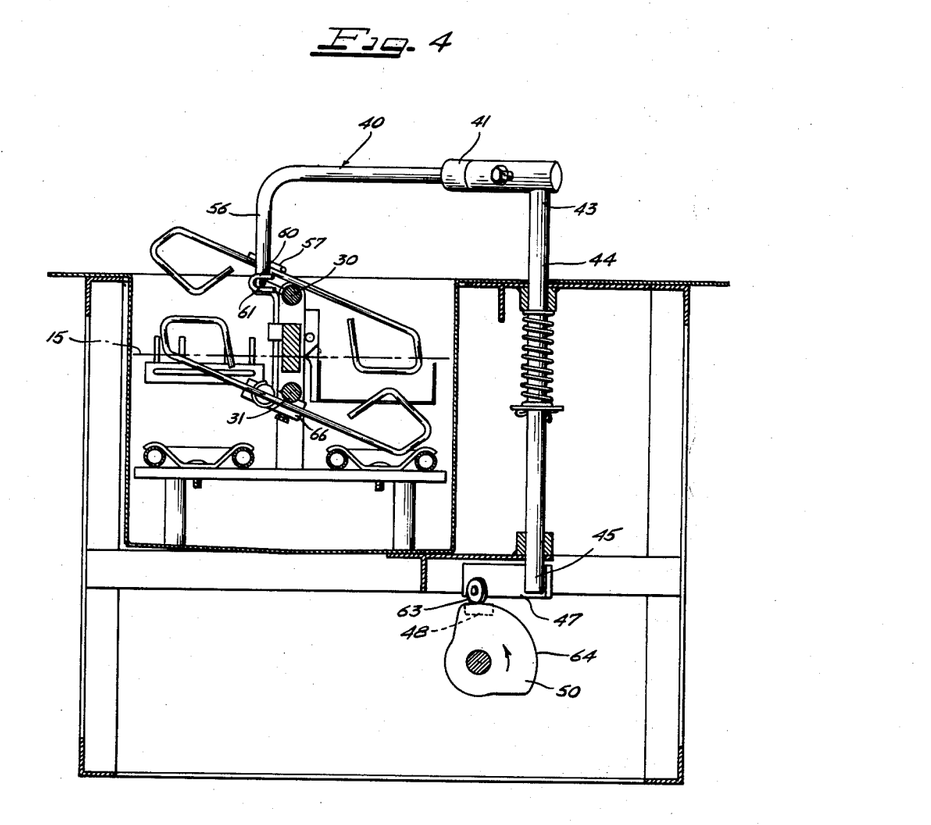
FIG. 4 is a transverse sectional view on an enlarged scale taken on line 4—4 of FIG. 1, showing the arm means which imparts longitudinal as well as vertical movement to the pocket forming members, and showing the double acting cam which actuates said arm.
Figure 9:
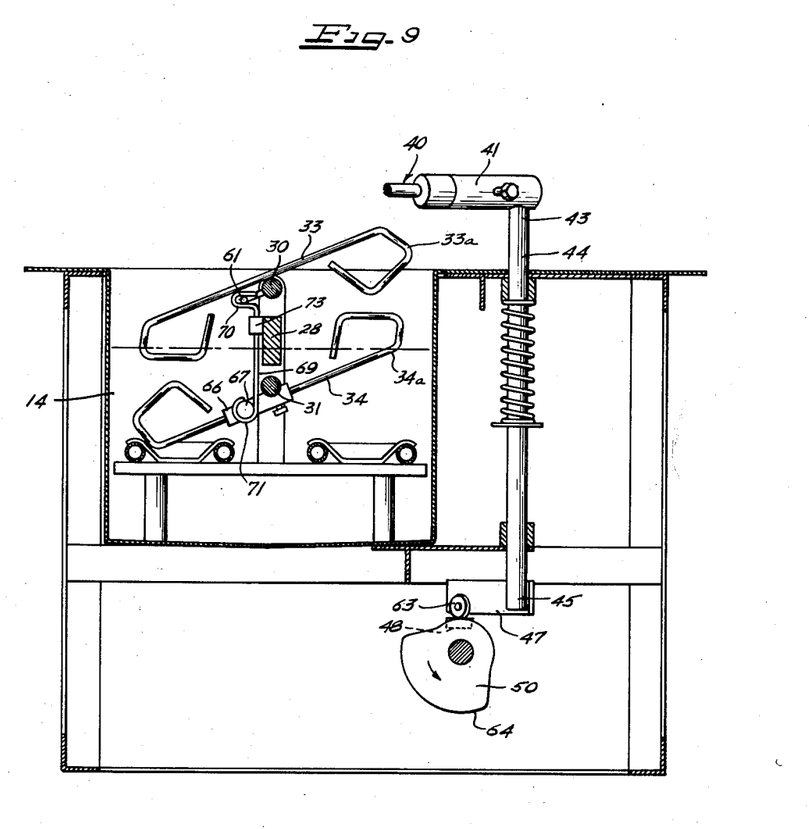
FIG. 9 is a transverse sectional view on an enlarged scale taken on line 9—9 of FIG. 6 showing the pocket forming members in a pivoted or reverse position, and showing the connecting link for tieing in the bottom pocket forming members with the upper pocket forming members.

Disposed intermediate the upstanding supports 26 and secured thereto is a divider plate on bar 28, which being positioned at the liquid level 15 of the oil effectively divides the trough and provides two channels therein for advancement of the article during the cooking cycle, as will be explained. An upper shaft 30 and lower shaft 31, vertically aligned and rotatably supported by the upstanding supports 26 have secured thereto pocket forming or article confining members 33 and 34, respectively. Referring to FIGS. 4 and 9, the pocket forming members 33 and 34 occupy one or the other of the two positions illustrated therein, and in such disposition have a widened end portion 33a and 34a, respectively, at about the liquid level and adjacent the doughy article 35 "floating" thereon. Thus, as best seen in FIG. 1, a pocket for retaining a doughy article is defined by the trough wall 14a, the divider plate 28, and members 33 and 34, as the case may be. As will be more fully described later, this arrangement provides sixteen pockets or cells, with eight cells on one side of the trough accommodating advancement of the article through the first one-half cycle and the other eight cells accommodating movement of the article through the last one-half of the cooking cycle in a direction indicated by arrow 38.

For purposes of explanation of the cooking cycle, the first pocket or cell is the loading station, indicated by reference letter A, and it is at this station that the doughy article in a raw or uncooked state is initially introduced into the cooking oil. The eighth and ninth pockets or stages of the cooking cycle comprise the "flip-over" station, indicated by reference letter B, and it is at this station that the doughy article, cooked only on its underside, is flipped over and transferred to the other channel. The sixteenth pocket or cell is the ejection station, indicated by the reference letter C, and is the final stage of the cooking cycle whereat the fully cooked article, in the present case a doughnut, is withdrawn from the oil. All other pockets or cells comprise cooking stations intermediate A and B, or B and C, through which the article is successively passed for the proper cooking period.

In order to pass the article through the cooking stations and along the channels defined by divider plate 28 and trough walls 14a, it is necessary to provide longitudinal movement of at least one series of pocket forming members. In the cooking device shown it is the upper series of pocket forming members 33 carried by shaft 30 which move longitudinally back and forth to advance the article from pocket to pocket. Obviously movement of shaft 30 in the direction of arrow 37 (see FIG. 1) will advance all articles in the one channel lying between loading station A and flip-over station B. Such longitudinal movement of the pocket forming members 33 will not however act upon articles lying in the other channel between flip-over station B and ejection station C, since the angular position of the members 33 is such that only one end 33a of said member is in pocket forming position, the other end 33A being elevated sufficiently to pass over and clear of the floating article in the other channel. Movement of shaft 30 in the direction of arrow 38 (see FIG. 1) occurs only when the pocket forming members 33 have been pivoted into the other angular position shown in FIG. 9, whereupon articles in the other channel between flip-over station B and ejection station C are advanced, the articles in the one channel between loading station A and flip-over station B being unaffected.

It should be pointed out that while both shafts 30 and 31 are free to rotate in their supports 26, only upper shaft 30 is movable longitudinally. Such longitudinal movement of upper shaft 30 and the pocket forming members 33 secured thereto is accomplished through the arm 40 (see FIGS. 4 and 9) which has one end 41 thereof connected to the upper portion 43 of a rod 44, the lower portion 45 of said rod 44 having an offset block 47 attached thereto which carries a cam follower 48, said cam follower riding on the cam surface 51 formed on the side of the double acting cam 50. As shown in FIG. 1, a second cam 53 spaced apart from the cam 50 provides a companion cam surface 54 which maintains the cam follower 48 in intimate contact with the cam surface 51 of cam 50. The other end 56 of arm 40 is disposed within a U-shaped member 57, said U-shaped member being fixed to a pocket forming member 33 and thus to shaft 30.

Figure 6:
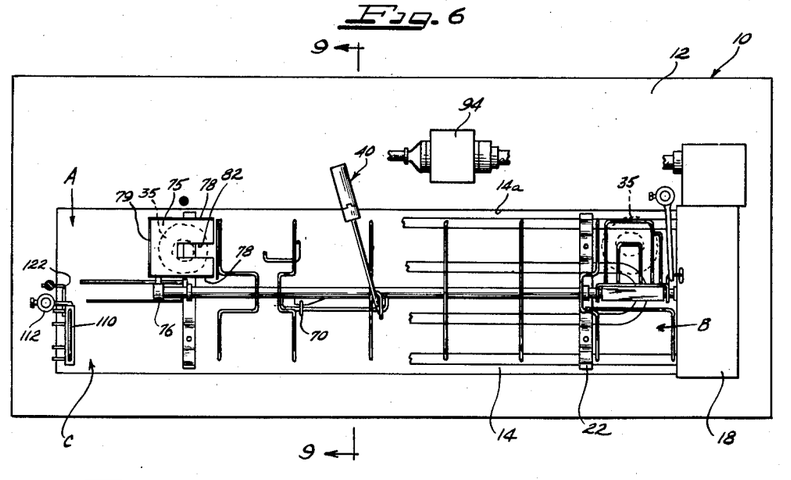
FIG. 6 is a plan view of the cooking device similar to that shown in FIG. 1, but showing the articles advanced in the cooking cycle.

It should be apparent that rotation of double-acting cam 50 acts through cam follower 48 to cause block 47 to pivot or turn the rod 44, thereby swinging arm 40 about rod 44 as a pivot point and through the U-shaped member or yoke 57 moving the shaft 30 in a longitudinal direction. FIGS. 1 and 6 illustrate the extent of the swing of arm 40 and the longitudinal movement of shaft 30 with its pocket forming members 33.

In addition to the longitudinal movement of the pocket forming members 33 for moving the articles 35 through the oil along the trough channels, a vertical movement of said members is necessary so that the end portion 33a can be withdrawn from the oil and returned longitudinally for confirming and moving a succeeding article. This verticle movement is accomplished through the arm 40 and is best seen by referring to the FIGS. 4 and 9.

As shown, the end portion 56 of arm 40 has a hook or yoke portion 60 which engages a wire or loop member 61 spaced from but attached to the shaft 30. The previously mentioned block 47 which is fixed to the lower portion 45 of rod 44 has a cam follower 63 carried on the side thereof which rides on the peripheral cam surface 64 of the double acting cam 50. Thus, as cam follower 63 rides the high and low portions of cam surface 64, rod 44 is moved up and down, as the case may be, and through loop 61 (likewise moved up or down) imparts a rotation to shaft 30. Pocket forming members 33 being fixed to upper shaft 30 it is obvious that rotation of said shaft will cause like movement of the end portions 33a. The pocket forming members 33 being disposed in operative relation, one end will be in the oil when the other is out, and vice versa.

Referring particularly to FIG. 9, there is shown a block or plate member 66 fixed to the lower shaft 31 having a pin 67 extending from the side thereof. A connecting rod 69 having its upper portion 70 engaging loop 61 and its lower portion 71 engaging the pin 67 is slidably retained by journal 73 mounted on divider plate 28. It should be apparent that any movement of loop 61, as previously described, will cause like movement of the plate 66, which will cause simultaneous rotation of upper shaft 30 and lower shaft 31. As shown in FIGS. 4 and 9, which represents the extremes of rotation for shafts 30 and 31, whenever the end portion 33a of an upper pocket forming member is elevated out of the oil, the end portion 34a of the underlying lower pocket forming member is disposed in position relative the liquid level to prevent uncontrolled movement of the article being moved. As best seen in FIGS. 1 and 6, loop 61 is of sufficient length as to maintain engagement with upper portion 70 of the connecting rod 69 even though the loop moves longitudinally with shaft 30 to which it is affixed.

It is important to note through the unitary double acting cam 50 both reciprocating and rotating movement can be imparted to the rod 44. Thus, the single arm 40 is the actuator for longitudinal movement of the upper series of pocket forming members 33, as well as vertical movement of both the upper and lower series of pocket forming members, 33 and 34, respectively. Obviously, through the use of a single cam with multiple cam surfaces there is no danger of pocket formation being out-of-phase.

Figure 3:
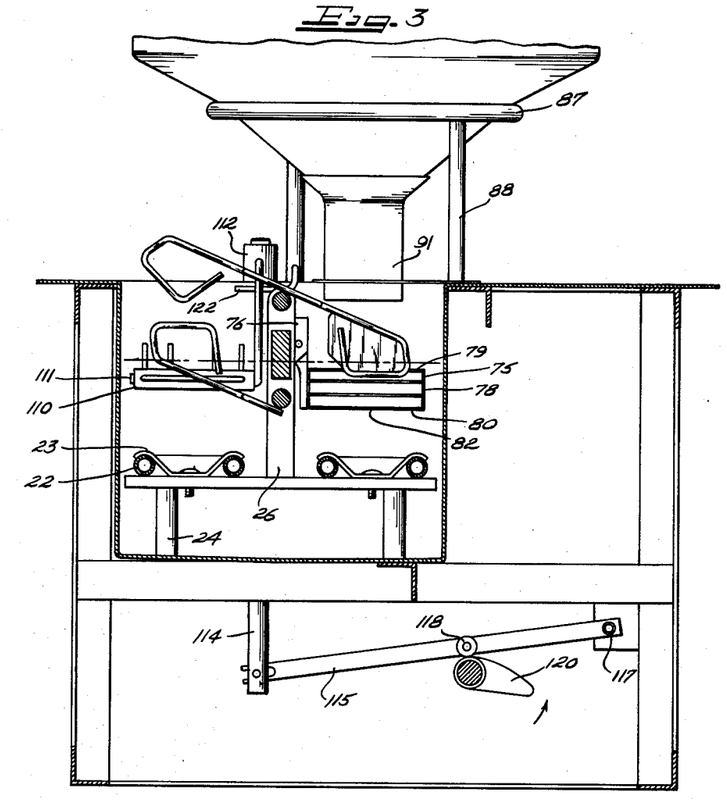
FIG. 3 is a transverse sectional view on an enlarged scale taken on line 3—3 of FIG. 1 with the hopper broken away, showing the drop pan and ejector member (being the initial and final stations, respectively, of the cooking cycle) in article receiving positions.
Figure 7:
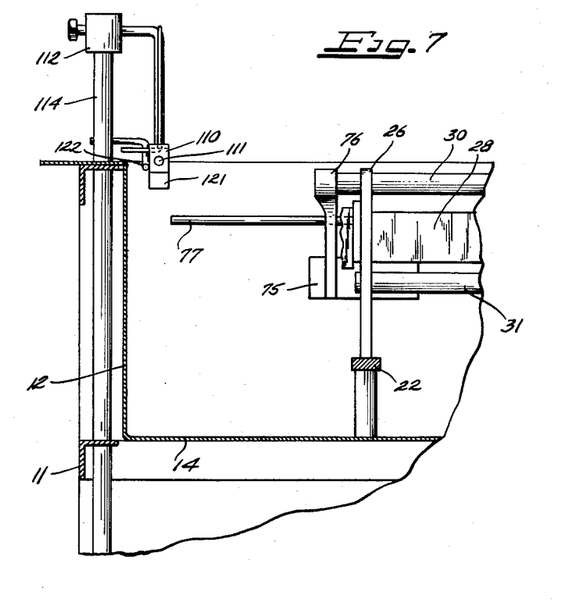
FIG. 7 is a vertical sectional view on an enlarged scale taken on line 7—7 of FIG. 6, showing the ejector member operative and the drop pan advanced.
Figure 10:
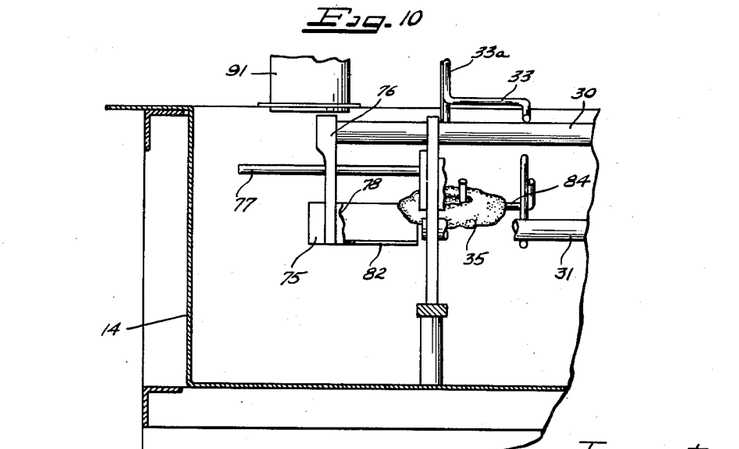
FIG. 10 is a fragmentary view in section showing the drop pan in an intermediate position of return to its initial position, and the hook operatively engaging an article.

Referring now to FIGS. 3, 7 and 10 it can be seen that a drop pan 75 is secured by means of a bracket 76 to the very end of upper shaft 30, said bracket accommodating a guide rod 77 suitably fixed to support 26. The drop pan is formed to provide side walls 78, a back wall 79, and a bottom wall or base 80. The drop pan being affixed to the shaft 30 is movable longitudinally with said shaft, and to facilitate movement of the pan through the oil the back wall 79 is preferably of open structure, such as wire strands as shown. As shown clearly in FIG. 6, the drop pan base 80 is formed to provide a cut out portion on slot 82, which is designed to permit movement of hook 84 therethrough for "hooking" the doughy article or doughnut and maintaining the doughnut in position when the drop pan is returned to its original position for reception of another doughy article. The hook 84 is integral with an end portion 34a of a lower pocket forming member 34, such that upon elevation of the overlying end portion 33a precedent to its longitudinal return for movement of the next article, the end portion 34a moves up into pocket forming position and hook 84 passes through slot 82 and into engagement with the article within the drop pan.

The drop pan and hook arrangement described is a most important feature of this invention since the other automatic features of the cooking device are dependent on the proper and continual introduction of doughy articles into the cooking cycle. Many problems occur at the loading station and two at least can be considered of major importance.

First, the doughy article when introduced into the oil sinks and will not rise to float until it is "sealed over." The normal time for "sealing over" is about three or four seconds and, as will be pointed out later, this approximates the time for which the drop pan is available as a support for the article. Obviously, should the doughy article not seal over and rise within the time allotted, it would remain in the drop pan and return to the loading station preventing a proper drop of the next doughy article.

Secondly, the continual movement of the pocket forming members in and out, as well as through the cooking oil, sets up eddys and currents which tend to move the floating articles about. Particularly strong is the backwash developed when the drop pan returns to its loading position. This backwash becomes very critical since the very presence of the drop pan prevents the use of a lower end portion 34a to form a pocket while the drop pan returns to loading position. Because the drop pan bracket 76 is freely mounted on shaft 30, rotation of the shaft does not effect the drop pan which always stays just below liquid level and has only a longitudinal movement; for this reason it would appear that any pocket forming means to entrap the doughy article would be most complex.

As described, the slotted drop pan and hook arrangement assures maintaining the advanced doughy article in position while the drop pan returns to the loading station, and this whether the article rises in the allotted time or remains heavy.

With respect to the loading station A it should be noted that the present invention contemplates a stationary hopper as a source of dough supply 86. The means for accommodating and supporting the hopper 86 is a ring-like member 87 supported by legs 88 suitably secured to the body portion 12 of the cooking device. A guide plate 90 fixed to the body portion 12 receives and retains the hopper nozzle 91 in a position directly overlying the drop pan 75 when said drop pan is in a load receiving position.

The mechanical construction of the hopper which produces the extrusion or dropping of a ring of dough from the nozzle portion does not form a part of this invention and so shall not be described. It is sufficient that this hopper is adequately mechanized as to drop a doughy article into the oil in the area of the drop pan when actuated. The hopper is electrically operated and reference numeral 93 designates the electrical connection to juncture box 94 and the source of electrical supply. Leads 96 connect the juncture box 94 with a micro-switch 97 (see FIG. 8) and through a cam 98 the hopper is actuated intermittently and at a predetermined time when the drop pan is in position to receive a ring of dough.

Figure 5:
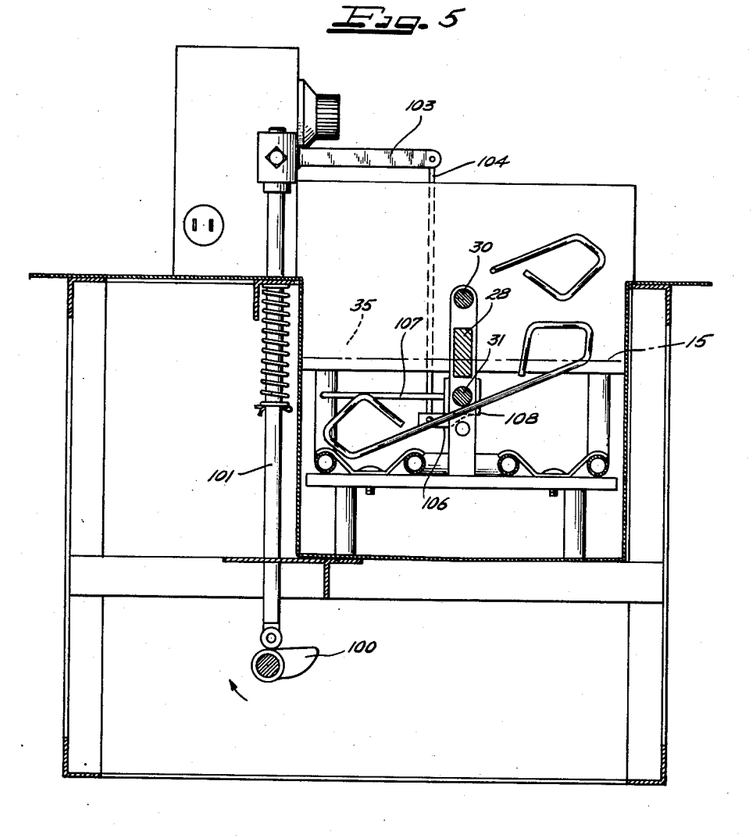
FIG. 5 is a transverse sectional view on an enlarged scale taken on line 5—5 of FIG. 1, showing the means for "flipping" the article over after approximately one-half the desired cooking time has elapsed.

Referring now to FIGS. 1 and 5, they show "flip-over" station B, whereat a floating doughy article thoroughly cooked on the underside is flipped over and transferred from one channel to the other channel. This is accomplished through cam 100 which raises rod 101, and through cross arm 103 which raises rod 104 that is secured at its lower end to a bell crank or lug 106 formed integral with the flipper 107, through brace 108, said brace being freely mounted on shaft 31, whereby flipper 107 is caused to pivot upwardly about shaft 31 pitching the doughy article carried thereby over and into the other channel.

Referring to FIGS. 3 and 7, there is shown in detail the ejection mechanism for withdrawing the fully cooked article from the oil and ejecting said article from the cooking device. This ejection mechanism comprises an ejector frame 110 pivotally mounted on a rod 111 which depends from and is suitably secured to a collar 112, said collar being fixed to a cam rod 114. The cam rod 114 is suitably journalled through the frame members of the machine and is connected at its lower end to a link arm 115 which is pivotally connected to the machine frame, as at 117. Intermediate the pivotal connection 117 and the connection to the cam rod 114, the link arm 115 is provided with a cam follower 118 which rides on cam 120. When cam 120 moves to pivot link arm 115 about pivotal connection 117 cam rod 114 raises, causing a similar raising of rod 111, whereupon ejector frame 110 is elevated. The ejector has a lug or arm portion 121 which is disposed so as to strike a rod 122 which extends from and is fixed to post 88, said rod 122 being located slightly below the top of the trough. Upon lug 121 striking rod 122, and a continuation of the elevation of ejector frame 110, the ejector frame is pivoted upwardly about its rod 111 thereby pitching any article carried by the ejector out of and away from the machine and into a suitable receptacle (not shown).

Figure 8:
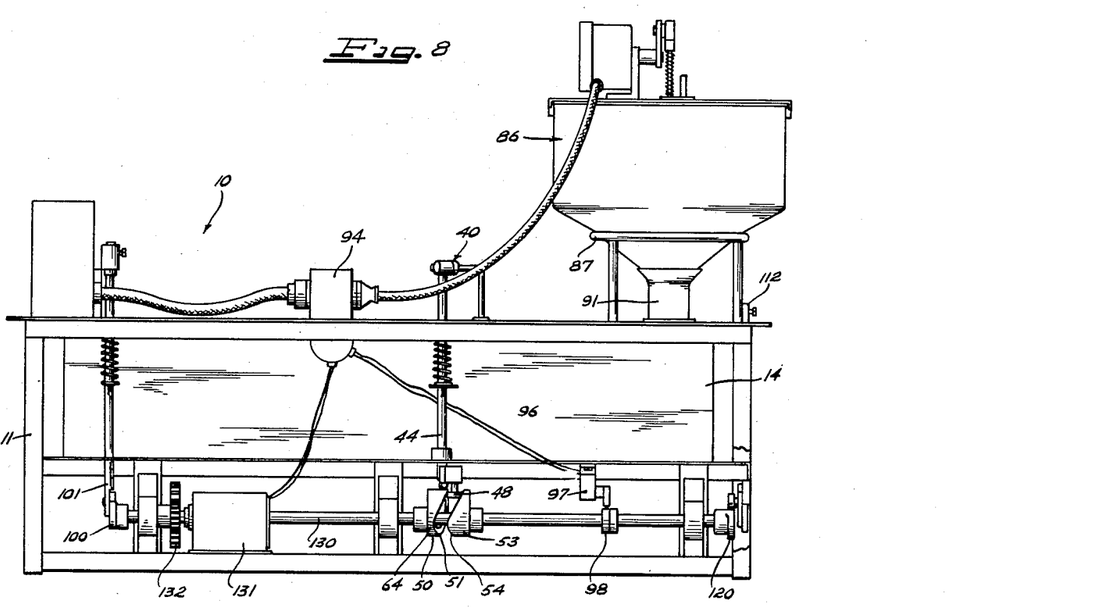
FIG. 8 is an elevational view of the backside of the machine showing the drive shaft and cam arrangement.

As best seen in FIG. 8, the double-acting cam 50, the flip-over cam 100, the ejector cam 120, and the micro-switch cam 98 are all mounted on a single drive shaft 130, said drive shaft being operated directly from motor 131 through the gear arrangement 132. It should be apparent that with a single main drive such as this there is no possibility that the automatic and interrelated actions of this device will be out of phase or get out of synchronization through slippage, wearing of parts, etc. The drive is positive and the timing for stations once set will remain consistent. This substantial reduction of parts over that now known and practical in the art is an important feature of this invention.

In the improved cooking device as shown in the accompanying drawings and as set forth in the foregoing description, it is contemplated that the cooking time per article or doughnut be 96 seconds with the cooking oil at approximately 375 degrees Fahrenheit. With the trough divided to provide two channels and a flip over station, each doughnut is to be cooked for 48 seconds on each side. The construction is such that eight pockets or cells are formed in each channel; thus, while the entire cooking cycle is 96 seconds the machine and its component features are on approximately a 6 second cycle.

This rapid cycling of the machine illustrates the importance of timing and the necessity for overlap of related functions at the various stations. For example, the hopper must be timed to drop dough slightly before the drop pan has reached dead center underlying the hopper nozzle; the ejector must be ejecting a finished doughnut while all doughnuts in the one channel between the loading station and the flip-over station are being advanced; the flipper must begin its action when the doughnuts in the other channel between the flip-over station and the ejection station are only partially advanced.

The main purpose of this type of cooking device is mass production, and any malfunction at the loading station or varied function through the drive system would interrupt the operation at great cost. The improvements as set forth in this specification minimize failures in these areas as well as providing an economical machine, both as to construction and maintenance.

While the foregoing specification has set forth the invention in specific terms, it is understood that many further variations and modifications may be resorted to without departing from the broad aspects of the invention as defined in the appended claims.

Having now described the invention, what is claimed is:

1. Cooking apparatus comprising: a tank having a bottom wall for containing a heated fluid cooking medium, means in said tank for advancing a food article therethrough including; article engaging means, means mounting said article engaging means for reciprocating movement alternatively parallel to said bottom wall and normal to the bottom wall of said tank, a drop pan having a bottom and movable between a first position below supply means for introducing an uncooked food article into said tank whereby an introduced food article will be received in said drop pan, and a second position within the path of said article engaging means, means connecting said drop pan to said mounting means for non-reciprocating engagement when said mounting means moves said article engaging means normal to said bottom and for positive reciprocating movement of said drop pan between said two positions when said mounting means moves said article engaging means parallel to said bottom, means connected to said article advancing means for sequentially engaging a food article in said drop pan when the latter is in said second position, withdrawing the food article from said drop pan and maintaining the food article in said second position when said drop pan is returned to said first position whereby said article engaging means will engage and advance the food article, and means for actuating said advancing means.

2. The apparatus of claim 1 wherein said means connected to said article advancing means includes a hook for sequentially engaging said food article confined in said drop pan when the latter is in said second position, withdrawing the food article from said drop pan and maintaining the food article in said second position when said drop pan is returned to said first position whereby said article engaging means will engage and advance the food article.

3. The apparatus of claim 2 wherein said drop pan is provided with a slotted bottom to permit passage of said hook therethrough.

4. The apparatus of claim 1 wherein the means for actuating said advancing means includes a single drive shaft, and ejection means for removing a food article from said liquid and in timed relation one to the other.

5. The apparatus of claim 4 including an electric motor for operating said supply means and a switch operative responsive for actuation to said drive shaft and connected to said motor for controlling operation of said motor.

6. The apparatus of claim 1 wherein said means mounting said article engaging means includes a pivotable and reciprocating arm member for said alternatively reciprocating movement of said article engaging means and wherein said advancing means includes article holding means rotatably mounted below said article engaging means, and linkage means connecting said article engaging means and said article holding means so that rotation of said article engaging means causes rotation of said article holding means.

References Cited in the file of this patent
UNITED STATES PATENTS

| | | |
|---|---|---|
| 1,240,204 | Healey | Sept. 18, 1917 |
| 2,160,123 | Carpenter | May 30, 1939 |
| 2,201,364 | Carpenter | May 21, 1940 |
| 2,966,840 | Forsyth | Jan. 3, 1961 |